Jan. 22, 1963   J. F. LUCKLUM   3,074,376
ANIMAL FEEDER
Filed May 11, 1961   3 Sheets-Sheet 1

Joseph F. Lucklum  INVENTOR.

BY *Clarence A. O'Brien*
*and Harvey B. Jacobson*
Attorneys

Jan. 22, 1963 J. F. LUCKLUM 3,074,376
ANIMAL FEEDER
Filed May 11, 1961 3 Sheets-Sheet 3

Joseph F. Lucklum
INVENTOR.

BY Clarence A. O'Brien
and Harvey B. Jackson
Attorneys

United States Patent Office 3,074,376
Patented Jan. 22, 1963

3,074,376
ANIMAL FEEDER
Joseph F. Lucklum, R.F.D. 4, Huron, S. Dak.
Filed May 11, 1961, Ser. No. 109,354
9 Claims. (Cl. 119—53)

The present invention generally relates to a feeder for animals such as hogs, sheep, cattle and the like.

The primary object of the present invention is to provide a feeder for animals in which the device is free swinging by virtue of its being mounted on a portable supporting frame by a longitudinal axle assembly forming a single axis of support for the feeder hopper and feeder pan attached thereto.

Another object of the present invention is to provide a portable animal feeder in which the orientation of the feeder pan or trough may be vertically adjusted in relation to the ground surface thereby enabling the feeder to be employed with different types of animals or employed with animals of different sizes thus enabling the same feeder to be employed with small baby animals and adjusted vertically upwardly as the animals increase in size thereby retaining the feeder troughs at the optimum vertical elevation for the particular animal involved.

Still another object of the present invention is to provide an animal feeder which is free swinging so that the feed will be agitated and constantly supplied to the feeder pan or trough at all times.

Still another feature of the present invention is to provide an animal feeder having a novel supporting mechanism for the feeder pan in relation to the hopper whereby the feeder pan may be adjusted vertically in relation to the hopper for varying the discharge opening from the feeder into the feeder pan.

Still another important feature of the present invention is to provide a feeder in accordance with the preceding objects in which the feeder pan or trough is provided with a plurality of individual closures for the segments of the feeder trough thereby protecting the feed from rain, snow or the like but yet enabling the animals to have ready access thereto.

Still another feature of the present invention resides in the pivotal segmental lids for the feeding pan or trough whereby each animal may lift the lid with his nose and then eat out of the compartment they have opened. Also, the vertical adjustment of the feeder pan or trough in relation to the hopper enables the feeder of the present invention to be employed with different types of feed requiring different openings and also enables a control of the quantity of feed discharged into the pan.

In using the feeder of the present invention, the feeding operation will be conducted in an expeditious manner thus resulting in a considerable saving of time and labor. Further, the present invention is quite simple in construction, long lasting, dependable, easy to use, easy to adjust and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
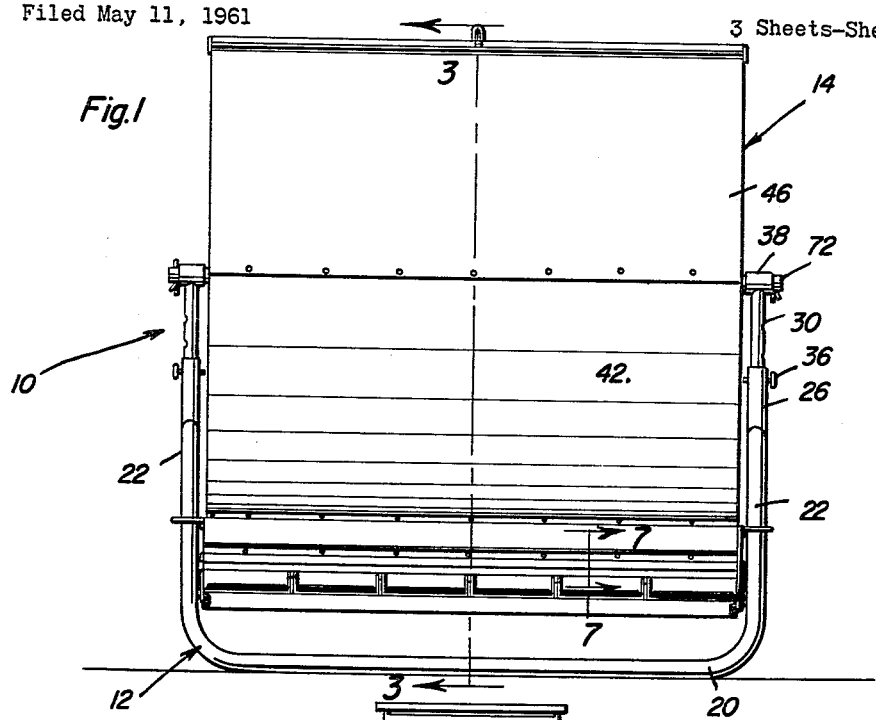
FIGURE 1 is a side elevational view of the feeder of the present invention.
Figure 2:
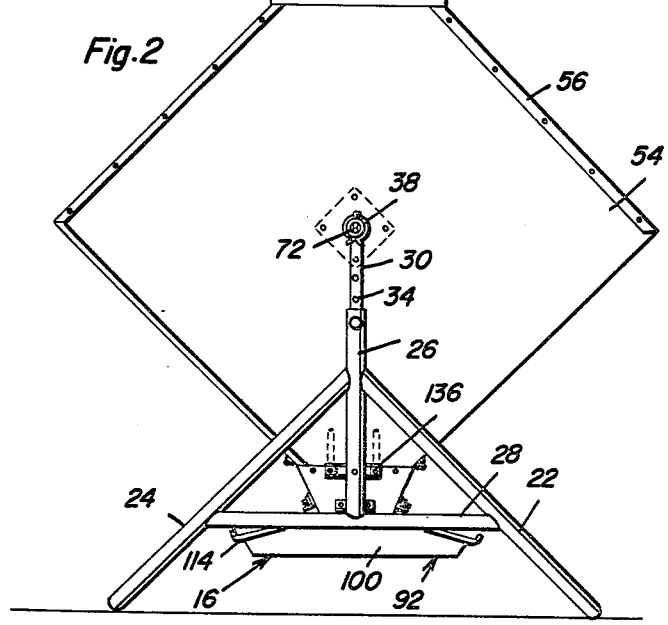
FIGURE 2 is an end elevational view of the construction of FIGURE 1.
Figure 3:
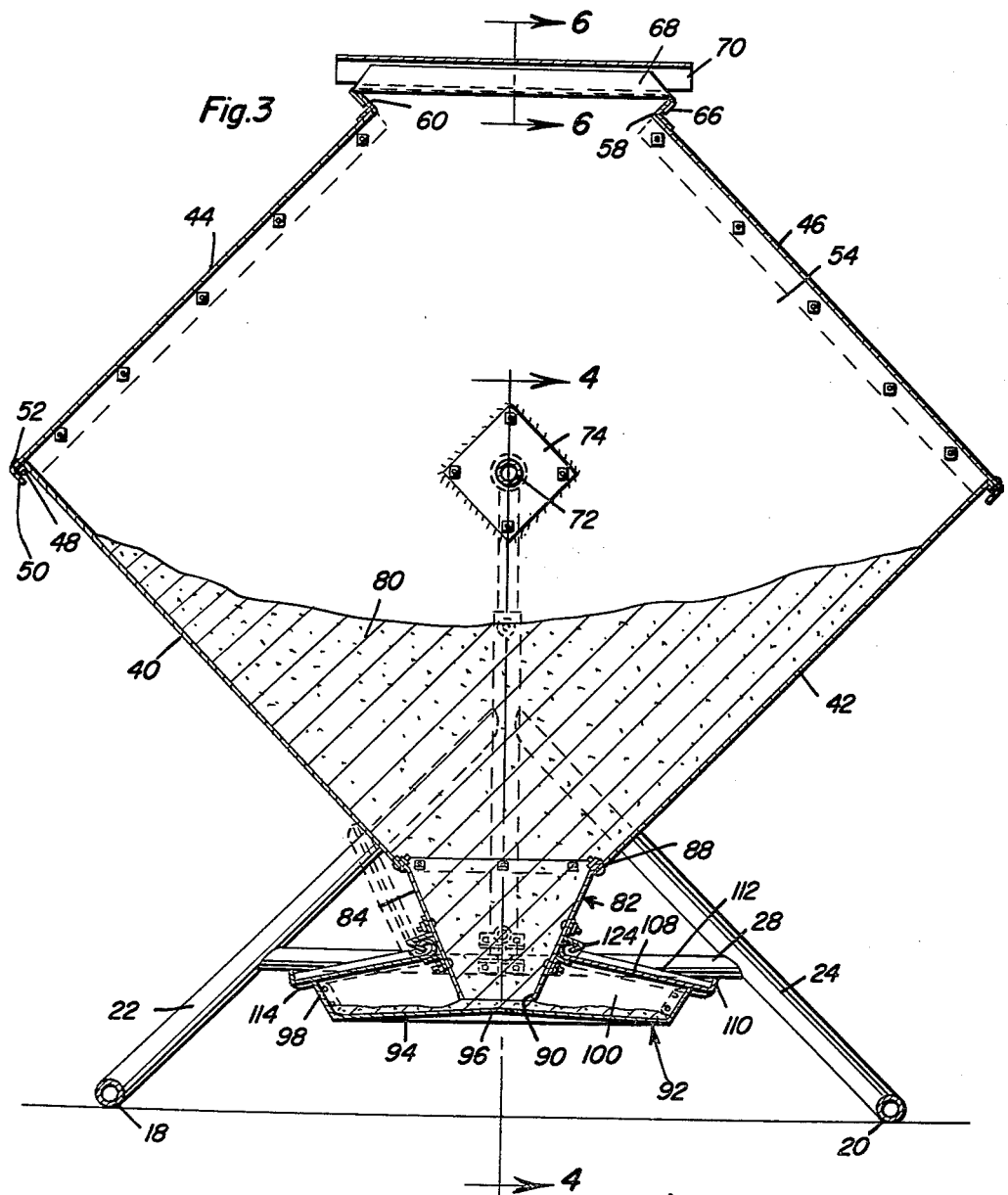
FIGURE 3 is a vertical sectional view on an enlarged scale taken substantially upon a plane passing along section line 3—3 of FIGURE 1 illustrating the details of construction of the animal feeder.
Figure 6:
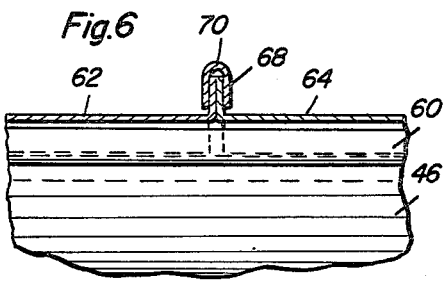
Figure 5:
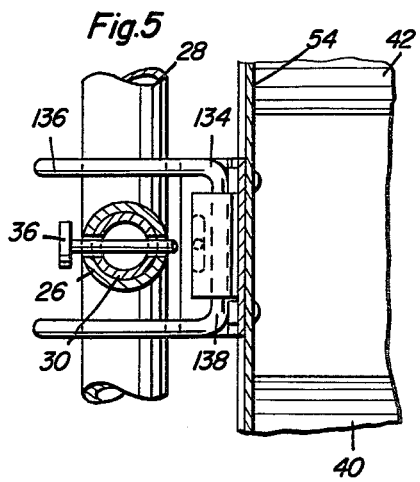
FIGURE 5 is a detail sectional view on an enlarged scale taken substantially upon a plane passing along section line 5—5 of FIGURE 4 illustrating the mechanism for locking the hopper from swinging.
Figure 7:
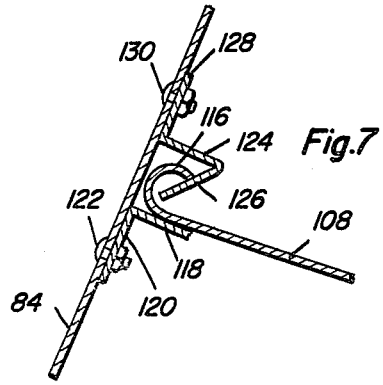

FIGURE 6 is a detail sectional view on an enlarged scale taken substantially upon a plane passing along section line 6—6 of FIGURE 3 illustrating the details of construction of the lid; and FIGURE 7 is a detail sectional view on an enlarged scale taken substantially upon a plane passing along section line 7—7 of FIGURE 1 illustrating the details of mounting of the individual lids for the feeding pan or trough.

Referring now specifically to the drawings, the numeral 10 generally designates the animal feeder of the present invention which includes a portable supporting base generally designated by the numeral 12 and a supply hopper generally designated by the numeral 14. The supply hopper 14 is provided with a feeding pan of trough assembly generally designated by the numeral 16 which is disposed at the bottom thereof.

The supporting base 12 includes a pair of longitudinally extending supporting rails 18 and 20 which engage the ground surface and are generally in parallel horizontal relation. Each end of each of the rails 18 and 20 is provided with an upwardly extending rail 22 and 24 respectively which converge towards each other and are rigidly affixed to vertical tubular rails 26. The tubular rails or frame members 26 are vertically disposed and extend above and below the upper end of the end rails 22 and 24 with the lower ends thereof being rigidly affixed to a transverse brace rail 28. Thus, a rigid supporting framework is provided in which the area between the rails 22, 24 vertical member 26 and brace 28 at the two ends of the frame is completely free of obstructions. This enables the hopper 14 to be received therebetween.

The upper end of the tubular rail 26 telescopically and vertically adjustably receives a depending support rod or tubular member 30 having a plurality of vertically spaced apertures 34 therein. The apertures 34 are adapted to receive a removable fastener pin 36 which extends through the upper end of the tubular member 26. Thus, by placing the pin 36 in one of the selected apertures 34, the horizontally disposed tubular bearing 38 at the upper end of the rod 30 may be adjusted vertically in relation to the supporting base.

The hopper 14 is of generally square cross sectional configuration and includes lower peripheral wall portions 40 and 42 and upper peripheral wall portions 44 and 46. The wall portions are disposed substantially in perpendicular relation to each other but with each of the walls generally disposed in 45° relation to a horizontal or vertical plane. The upper edges of the lower walls 40 and 42 have an outturned flange 48 thereon and the lower edge of the upper walls 44 and 46 extend across the flange 48 and terminate in an inturned flange 50 underlying the flange 48. The flange 48 is secured to the bottom portion of the walls 44 and 46 by suitable fasteners 52 thus serving to provide a weather seal between the juncture of the walls 40 and 44 and 42 and 46. Also, the walls 40, 42, 44 and 46 are interconnected by end walls 54 and the walls 44 and 46 have an inwardly extending flange 56 engaging the edges of the end walls 54 and disposed exteriorly thereof thus further forming a weather seal. While the details of the assembly of the hopper have been described, it is within the purview of the present invention to employ any type of connection between the various walls sufficient to provide a waterproof or weatherproof connection and yet be relatively inexpensive to manufacture.

The upper ends of the upper walls 44 and 46 terminate in spaced relation to each other to provide an entrance opening 58 and the free edges of the walls 44 and 46 are provided with an angle iron member 60 which forms an outwardly extending flange. A pair of lids 62 and 64 are provided for the opening 58 and each of the lids is provided with an inturned edge flange 66 engaging the outwardly extending flange of the angle iron member 60. The lids have depending end portions forming a closure for the opening and the abutting ends of the lids 62 and 64 have upturned flanges 68 which are adapted to engage each other and these flanges 68 are held in abutting relation by an inverted U-shaped clip 70 as illustrated in FIGURE 6. This retains the two lids 62 and 64 in closed relation and will enable the two lids 62 and 64 to be moved outwardly in relation to each other when the clip 70 is removed.

Disposed centrally between the end walls 54 is an elongated shaft or axle 72 projecting beyond the end wall 54 and rotatably received in the bearings 38. Where the shaft or axle extends through the end wall 54, there is a reinforcing plate 74 retained in place by suitable fasteners 76. The outer end of the shaft or axle 72 is provided with a removable fastener such as a cotter pin 78 or the like for retaining the shaft or axle 72 within the bearings 38. By removal of the fastener 78 and elevation of the hopper so that the rod 30 may be disconnected from the tubular standard 26, the hopper assembly may be completely removed from the supporting stand if desired. Otherwise, the axle 72 forms an axis of rotation for the hopper 14 whereby the hopper may swing about the horizontal axis formed by the axle 72. Due to the increased weight of the feeder pan assembly 16 and the weight of the feed 80 within the hopper, the hopper will normally be retained in the position illustrated in FIGURE 3 but may swing freely.

The feeder pan assembly 16 includes a feeder neck generally designated by numeral 82 which includes a pair of downwardly inclined and converging walls 84 interconnected by end walls 86. This neck 82 is attached to the lower edges of the walls 40 and 42 and the end walls 54 respectively by fastening bolts 88 or the like. The lower end of the neck terminates in the form of a longitudinal opening which forms a discharge opening 90 for the feed 80 within the hopper.

Disposed below the feeder neck 82 is a feeder pan or trough 92 which includes a bottom 94 having a crown or high area 96 at the center thereof underlying the discharge opening 90 so that the feed will be discharged laterally outwardly on the bottom 94 which extends to both sides of the feeder neck 82. The outer edges of the bottom 94 have upwardly and outwardly inclined side walls 98 and end walls 100 are provided on the trough or feeder pan for forming a closure for the end portions thereof.

The feeder trough 92 is adjustably supported from the end walls 86 of the feeder neck 82 by virture of an adjusting bolt 102. The adjusting bolt extends through flanges or lugs 104 and 106 rigid with the vertical end wall 100 and the vertical end wall 86 respectively whereby the bolt 102 may be effectively shortened or lengthened for adjusting the position of the bottom 94 in relation to the bottom edge of the discharge opening 90 thus controlling the quantity of feed 80 discharged into the pan and also enabling the device to be employed with different types of feed.

The area of the bottom exteriorly of the feeder neck 82 is open and accessible from the top thereof whereby animals may gain access to the feed. A plurality of closure lids 108 are provided for closing the feeder trough 92 when the feed is not being actually consumed. The lids 108 are gravity operated and each has an upturned outer edge 110 and upturned side edges 112 which are disposed alongside of each other when closed thus forming a closure for the entire length of the trough 92. The end lids 108 have a depending flange 114 on the outer end edge thereof for overlying the top edge of the vertical wall 100 thus forming a complete closure for the feeder trough 92 so that the feed therein will not be damaged due to rain or the like. Suitable drain openings may be provided in the lowermost portion of the bottom 94 to drain out any moisture which may happen to collect in the trough.

FIGURE 7 illustrates the details of the mounting structure for the lids 108 and this includes a generally semicylindrical inner edge portion 116 on the inner edge of each lid 108. Underlying the inner edge of the lid 108 is a flange 118 of an angle iron member 120 secured in place by a fastening bolt 122. Overlying the flange 118 is a projecting flange 124 disposed in spaced parallel relation thereto and terminating in an inwardly and downardly inclined flange 126. The flanges 124 and 126 form a part of an angle iron member 128 secured in place by fasteners 130. The angle iron members 120 and 128 are attached to the walls 84 respectively and the semi-cylindrical end portion 116 hooks under and behind the inturned flange 126 as illustrated in FIGURE 7 whereby the flange 126 will retain the lids 108 in position and also form a hinge connection for the lids 108 thus supporting the lids 108 for pivotal swinging movement from a position in engagement with the top edge of the feeder trough 92 to a position above the trough so that animals may have access into the interior of the trough by merely engaging their noses with the outer end of the desired lid and thus raising the lid upwardly so that the animal may gain access to the particular compartment involved. This will protect the feed when the feed is not actually being consumed and will also provide separation of the animals to a certain extent in that they can open only a single compartment at any one time.

Figure 4:
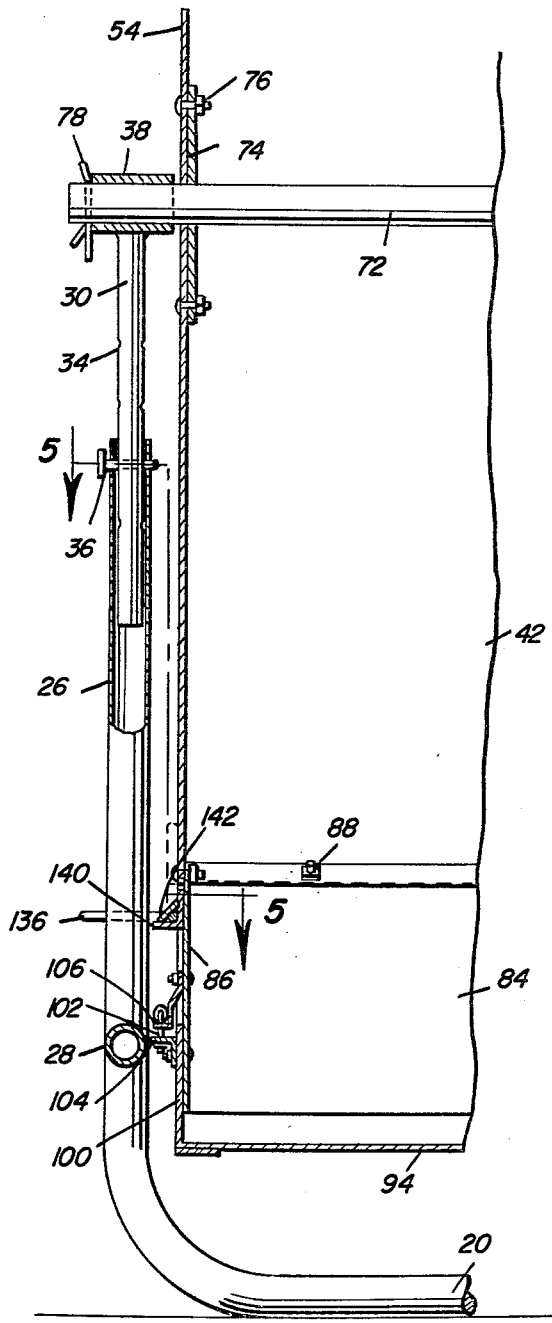
FIGURE 4 is a detail sectional view on an enlarged scale taken substantially upon a plane passing along section line 4—4 of FIGURE 3 illustrating the adjustment features of the present invention.

These is also provided a means for locking the hopper from free swinging movement which is desired at certain times such as when loading the hopper with feed. This structure includes a generally U-shaped member 134 having a pair of outwardly extending parallel legs 136. The bight portion 138 of the U-shaped member 134 is pivotally supported by virtue of an angle iron flange 140 and an overlying inclined retainer member 142 which pivotally retains the U-shaped member. The angle iron flange 140 is mounted on the end wall 54 and the legs 136 are swingable from a position disposed on opposite sides of the vertical standard 26 to a position lying alongside of the end wall 54 as illustrated in dotted lines in FIGURE 4. The retaining plate 142 frictionally engages the bight portion 138 of the U-shaped member 134 thus frictionally retaining the U-shaped latch member 134 in both of its positions.

The vertical adjustment afforded by the pin 36 enables the feeder pan to be adjusted to any desired elevation in relation to the ground within the limits of adjustment thus enabling the feeder to be employed with different sized animals and different types of animals so that it may be most efficiently used and employed for different animals and different locations. The adjustment of the feeder pan in relation to the feeder neck enables adjustment of the volume or quantity of feed to be discharged into the pan thus controlling the quantity of feed. Further, the individual lids provide compartmentation for the continuous feeder pan and also protect the feed in the pan from being damaged due to rain, snow or the like. The device is constructed of relatively inexpensive sheet metal or the like which will support a relatively large quantity of feed so that it will not have to be replenished except at lengthy intervals. The lid structure and the method employed in retaining the lid in closed position for the hopper will prevent the animals from moving the lid to an open position regardless of how they engage the lid components 62 and 64.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal feeder comprising a supporting base including upright supporting standards at each end thereof with a space provided between the standards, an enlarged hopper disposed between the standards, means attached to the ends of the hopper and journaled on the standards for pivotally supporting the hopper for rotational movement about a generally horizontal axis, each of said standards being longitudinally adjustable, means securing the standards in adjusted position thereby varying the vertical position of the hopper, said hopper including downwardly converging walls terminating in spaced relation thereby defining a longitudinal opening, a horizontally disposed feeder pan underlying said opening and projecting laterally from the side edges thereof, said pan having upturned edges thus forming a feeding area for animals whereby the animals may gain access to feed disposed in the pan exteriorly of the walls which define the openings, and means adjustably supporting the pan from the hopper for varying the space between the pan and the edges of the opening thereby controlling the quantity of discharge of material from the hopper into the pan.

2. The structure as defined in claim 1 wherein said supporting base includes a pair of spaced longitudinally extending supporting rails, said rails having integral upwardly converging ends terminating at and vertically supporting the upright supporting standards, said standards consisting of a pair of vertically adjustable telescoping members, said hopper being secured to and adjustable with the upper one of said pair of members.

3. The structure as defined in claim 1 wherein said means adjustably supporting the pan from the hopper includes laterally extending lugs on the hopper and on the pan on each end thereof, and adjustable fastening means extending between the flanges for independently adjusting the ends of the pan vertically in relation to the hopper.

4. The structure as defined in claim 3 wherein the feeder pan is provided with a bottom having a high central portion and downwardly inclined outward portion for assuring that feed will move from the center thereof to the exterior edge portions for access by animals.

5. The structure as defined in claim 1 wherein closure means for the portion of the feed pan extending laterally from the hopper is mounted on the hopper adjacent the discharge opening, said closure means being gravity operated whereby the closure means will automatically close when an animal is not holding the closure means open when consuming feed from the pan, said closure means including a plurality of independent panels co-operating to form a closure lid for the pan and serving to generally prevent lateral movement of an animal's mouth from one area of the pan to the other, and means hingedly and detachably connecting the inner ends of the panels to the hopper.

6. The structure as defined in claim 5 wherein said means hingedly attaching the panel to the hopper includes a reversely curved end on the inner end of the panel, a pair of spaced flanges on the hopper, the uppermost of said flanges having an inwardly and downwardly inclined flange hookingly engaged with the reversely curved edge of the panels thus hingedly and detachably connecting the panels to the hopper.

7. The structure as defined in claim 6 together with pivotally mounted U-shaped means mounted on said hopper for engagement with one of said standards for locking the hopper in position with the pan at the lowermost point thereby assuring that the closure panel will be held in closed position by gravity.

8. An animal feeder comprising a supporting base including upright supporting standards at each end thereof with a space provided between the standards, an enlarged hopper disposed between the standards, means attached to the ends of the hopper and journaled on the standards for pivotally supporting the hopper for rotational movement about a generally horizontal axis, said hopper including downwardly converging walls terminating in spaced relation thereby defining a longitudinal opening, a horizontally disposed feeder pan underlying said opening and projecting laterally from the side edges thereof, said pan having upturned edges thus forming a feeding area for animals whereby the animals may gain access to feed disposed in the pan exteriorly of the walls which define the openings, and means adjustably supporting the pan from the hopper for varying the space between the pan and the edges of the opening thereby controlling the quantity of discharge of material from the hopper into the pan, said hopper being provided with means interconnected with said standards for locking the hopper from swinging movement about its axis.

9. An animal feeder comprising a supporting base including upright supporting standards at each end thereof with a space provided between the standards, an enlarged hopper disposed between the standards, means attached to the ends of the hopper and journaled on the standards for pivotally supporting the hopper for rotational movement about a generally horizontal axis, said hopper including downwardly converging walls terminating in spaced relation thereby defining a longitudinal opening, a horizontally disposed feeder pan underlying said opening and projecting laterally from the side edges thereof, said pan having upturned edges thus forming a feeding area for animals whereby the animals may gain access to feed disposed in the pan exteriorly of the walls which define the openings, and means adjustably supporting the pan from the hopper for varying the space between the pan and the edges of the opening thereby controlling the quantity of discharge of material from the hopper into the pan, said hopper also including upwardly converging walls disposed in spaced relation forming a longitudinal entrance opening at the top of the hopper for receiving feed, said upwardly converging walls terminating in outwardly extending flanges, and a pair of cover lids slidably mounted on said flanges and forming a closure for the opening at the top of the hopper, said closure lids having upturned flanges at the inner ends thereof for abutting engagement when the closure lids are in closed position, and a retainer means engaging the upturned flanges on the closure lids for releasably retaining the closure lids in closed position.

References Cited in the file of this patent

UNITED STATES PATENTS

| | | |
|---|---|---|
| 1,398,179 | Dierks | Nov. 22, 1921 |
| 2,411,281 | Long | Nov. 19, 1946 |
| 2,514,910 | Strong | July 11, 1950 |
| 2,607,318 | Collier et al. | Aug. 19, 1952 |